(12) United States Patent
Li et al.

(10) Patent No.: US 11,907,035 B2
(45) Date of Patent: Feb. 20, 2024

(54) SIDEBAND SIGNALING OVER EXISTING AUXILIARY PINS OF AN INTERFACE

(71) Applicant: Intel Corporation, Santa Clara, CA (US)

(72) Inventors: Ang Li, Coquitlam (CA); David J. Harriman, Portland, OR (US); Kuan Hua Tan, Coquitlam (CA)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 16/875,898

(22) Filed: May 15, 2020

(65) Prior Publication Data

US 2020/0278733 A1  Sep. 3, 2020

(51) Int. Cl.
*G06F 1/28* (2006.01)
*G06F 13/42* (2006.01)
*G06F 1/04* (2006.01)

(52) U.S. Cl.
CPC ............... *G06F 1/28* (2013.01); *G06F 1/04* (2013.01); *G06F 13/4221* (2013.01); *G06F 13/4295* (2013.01); *G06F 2213/0026* (2013.01)

(58) Field of Classification Search
CPC .......... G06F 1/28; G06F 1/04; G06F 13/4221; G06F 13/4295; G06F 2213/0026
See application file for complete search history.

(56) References Cited

U.S. PATENT DOCUMENTS

| | | | | |
|---|---|---|---|---|
| 2016/0170929 A1* | 6/2016 | Pethe | ............. | G06F 13/102 710/313 |
| 2019/0041936 A1* | 2/2019 | Teoh | .......... | G06F 1/266 |
| 2019/0042155 A1 | 2/2019 | Ooi et al. | | |
| 2019/0042465 A1 | 2/2019 | Li | | |
| 2019/0138470 A1 | 5/2019 | Li et al. | | |
| 2019/0220422 A1 | 7/2019 | Tan et al. | | |
| 2019/0340146 A1* | 11/2019 | Chen | ............ | H03K 5/2481 |
| 2019/0340148 A1 | 11/2019 | Tan et al. | | |
| 2021/0365398 A1* | 11/2021 | Chih | ............ | G06F 13/4282 |

OTHER PUBLICATIONS

Horner, Rita; "Using PCI Express L1 Sub-States To Minimize Power Consumption in Advanced Process Nodes"; Semiconductor Engineering; < URL https://semiengineering.com/using-pci-express-l1-sub-states-to-minimize-power-consumption-in-advanced-process-nodes/>; Jul. 10, 2014. (Year: 2014).*

Knowlton, Scott, "Making the Most of PCIe® Low Power Feature," PCI-SIG, available online at <https://pcisig.com/making-most-pcie®-low-power-features>, at least as early as Sep. 15, 2019 (3 pages).

Solomon, Richard, "PCI", IEEE Consumer Electronics Magazine, Publication Dates Apr. 8, 2019 and May 2019 (2 pages).

\* cited by examiner

*Primary Examiner* — Glenn A. Auve

(74) *Attorney, Agent, or Firm* — Alliance IP, LLC

(57) ABSTRACT

An interface of a device is used to couple to another device and includes a set of data pins to support high speed data communication on an interconnect link between the devices based on an interconnect protocol. The interface further includes at least one auxiliary pin to support a particular signal defined by the interconnect protocol. The device is further configurated to generate hint data for use by the other device and send the hint data as a sideband signal to the other device over the auxiliary pin, where the sideband signal is distinct from signals defined for the auxiliary pin by the interconnect protocol.

20 Claims, 12 Drawing Sheets

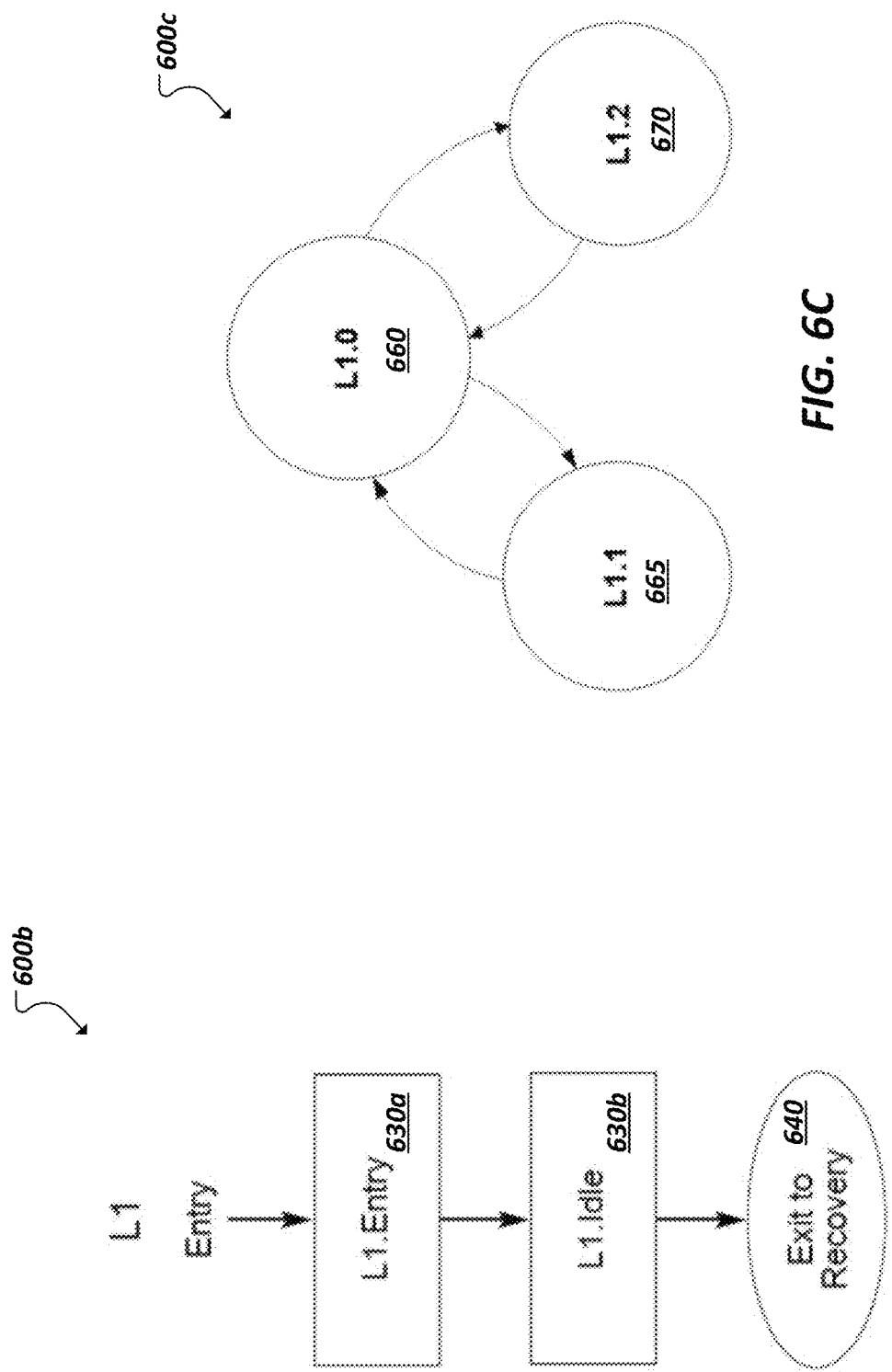

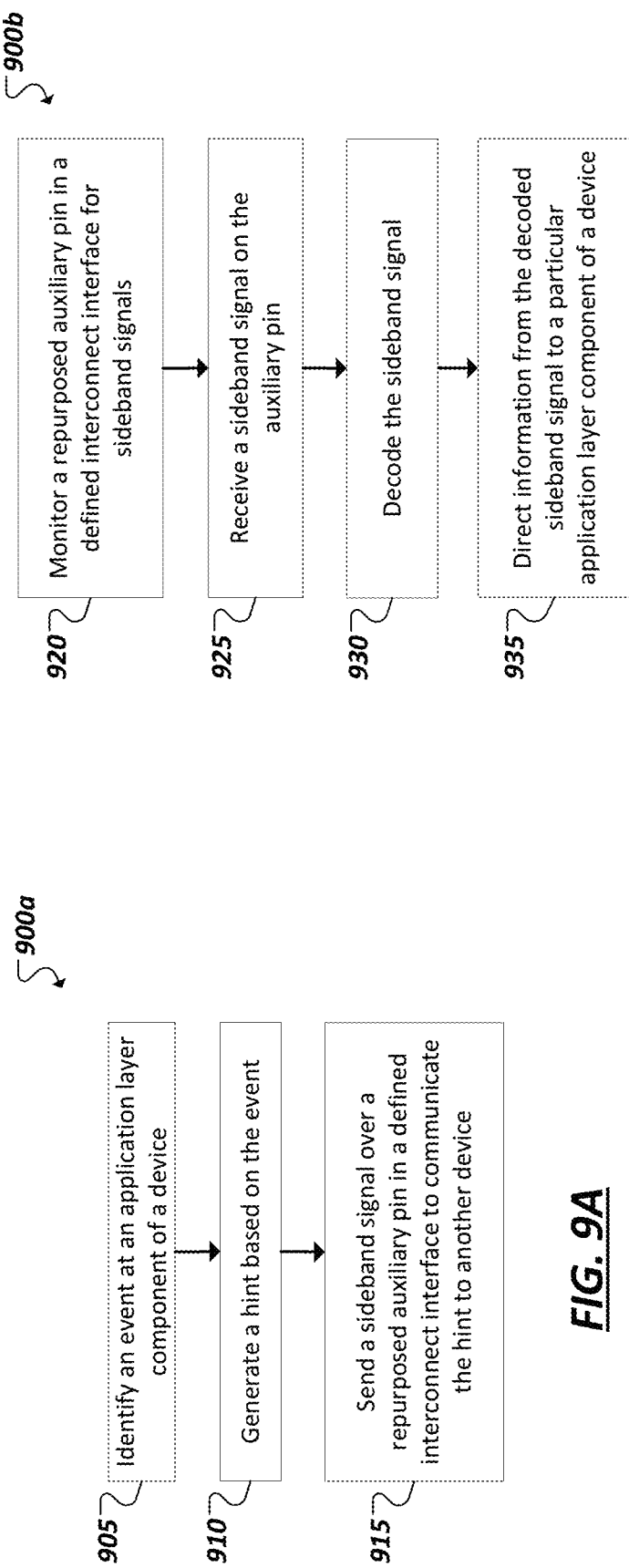

SIDEBAND SIGNALING OVER EXISTING AUXILIARY PINS OF AN INTERFACE

FIELD

This disclosure pertains to computing system, and in particular (but not exclusively) to computer interfaces.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

BRIEF DESCRIPTION OF THE DRAWINGS

FIG. 6A-6C illustrate state machine diagrams for a link.

FIGS. 9A-9B are flowcharts illustrating example techniques for supplementing use of auxiliary pins in a defined interface for sideband signaling.

DETAILED DESCRIPTION

Figure 1:
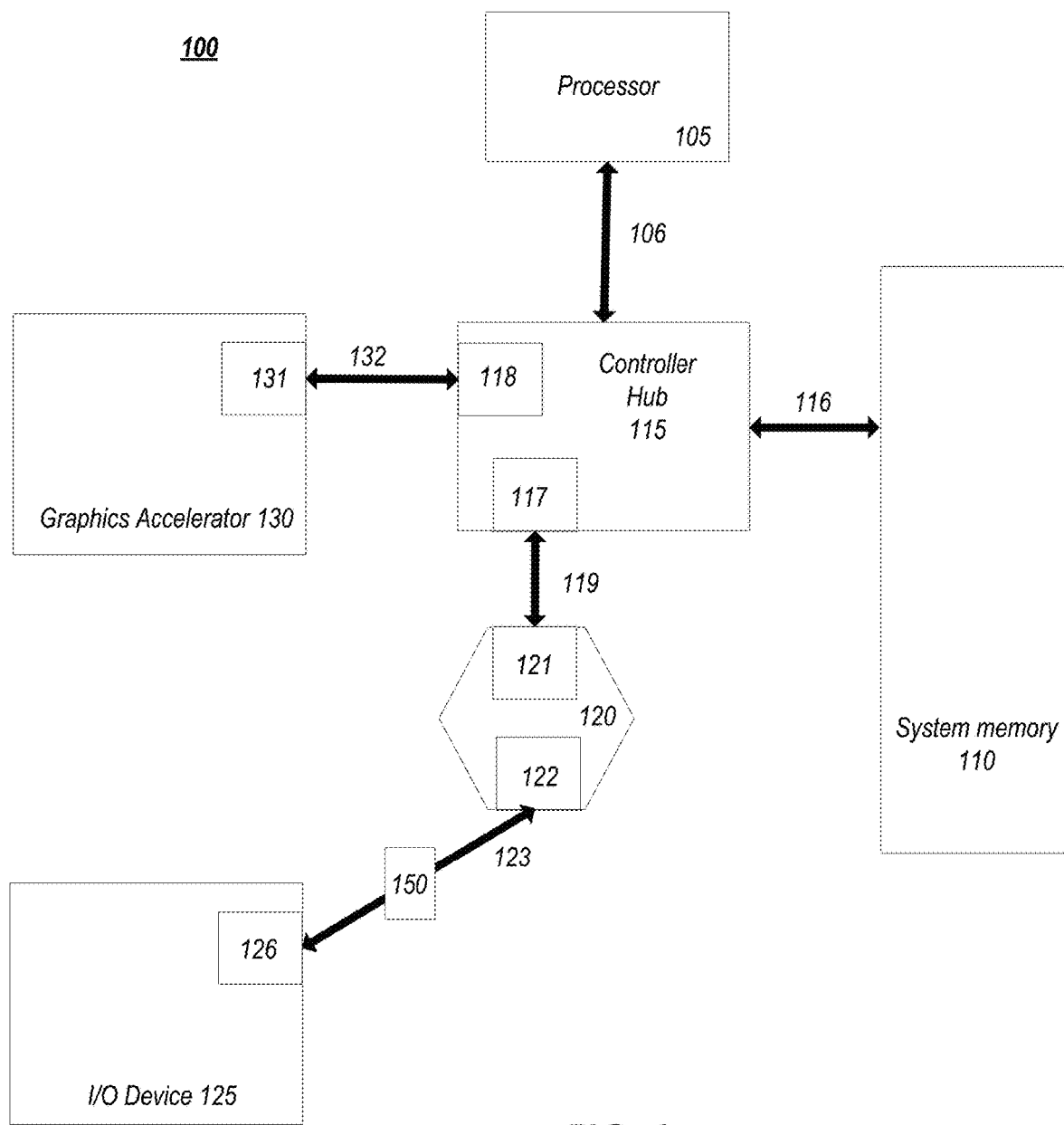
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the principles and solutions discussed in this disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, solid state memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
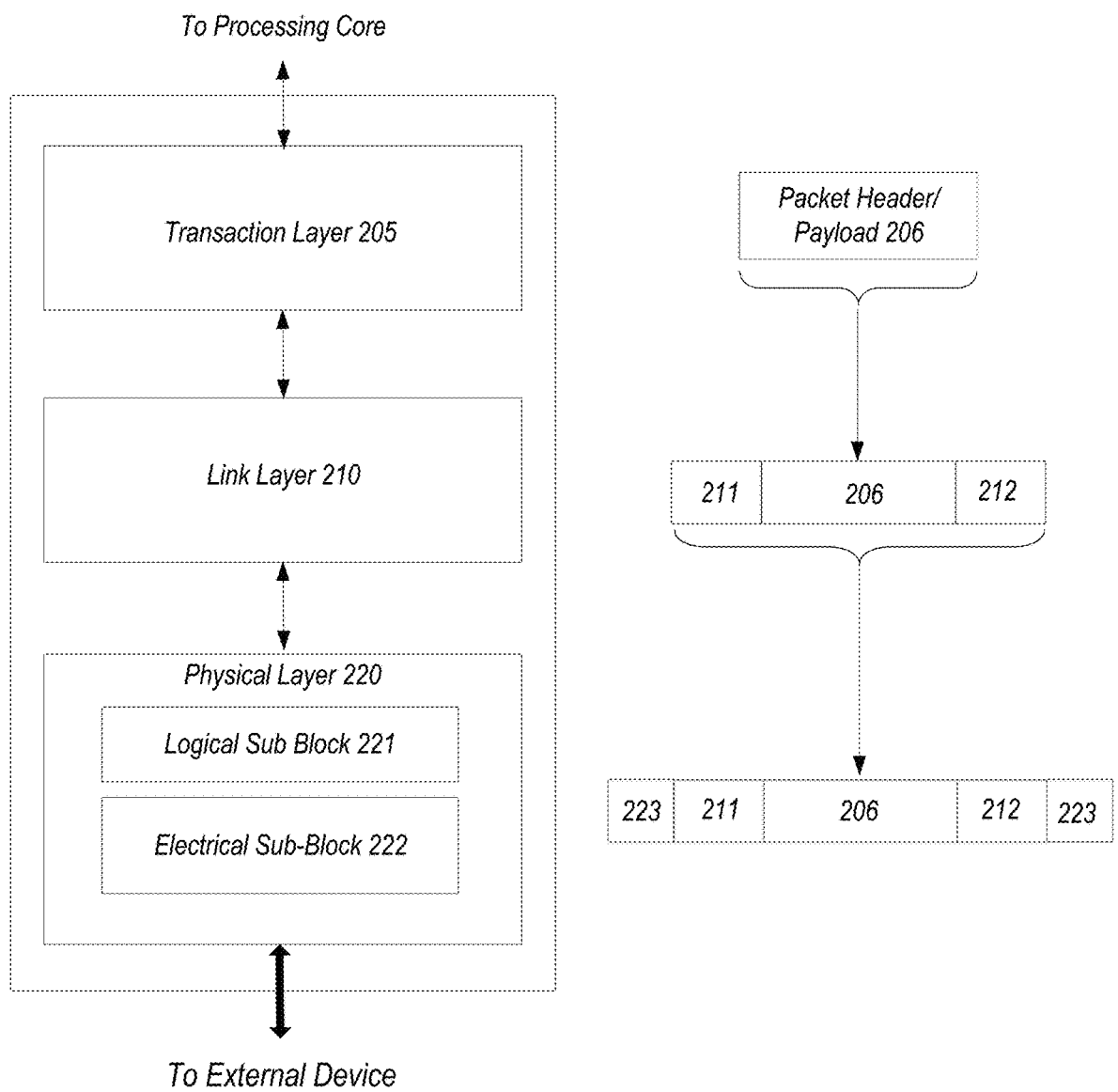
FIG. 2 illustrates an embodiment of an interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
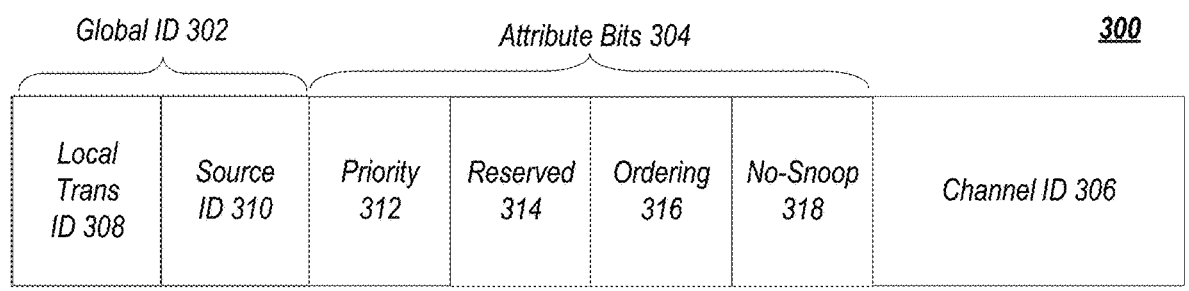
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8 b/10 b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
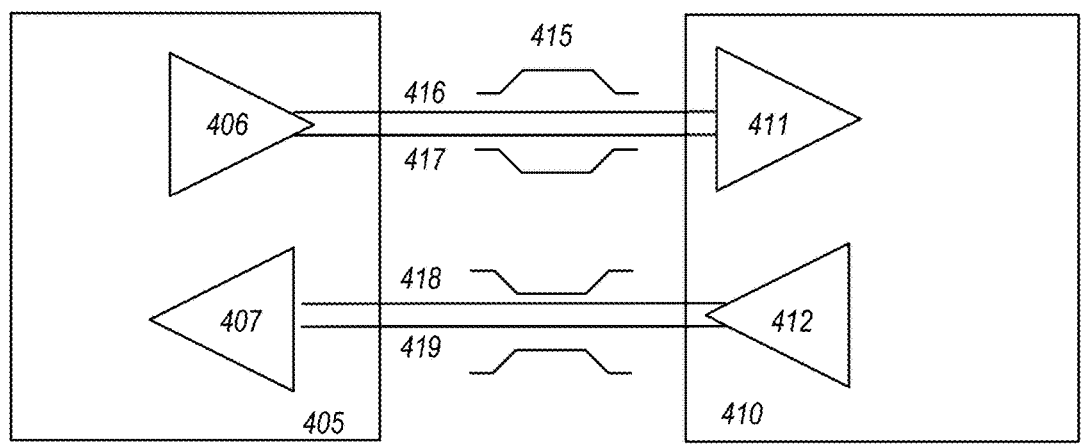
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., Displayport) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In PCIe, rapid advancements are taking place as the protocol evolves from generation 4.0 to generations 5.0 and 6.0. PCIe 4.0 may support 16 lane links with effective bandwidths of 64 GB/s and extended support for retimers and other features. PCIe 5.0 maintains the 16 lane link width, while doubling the effective bandwidth to 128 GB/s. To maintain these advances in bandwidth, PCIe 6.0 preserves the 16 lane link and adopts pulse amplitude modulation (PAM) encoding (e.g., PAM4 encoding), as opposed to PCIe's traditional non-return-to-zero (NRZ) encoding (e.g., 8 b/10 b, 128 b/130 b), to increase the number of bits that may be sent on a serial channel within a single unit interval (UI). Accordingly, PCIe 6.0 further doubles bandwidth to 64 GT/s from 32 GT/s in PCIe 5.0 thereby enabling 256 GB/s of bidirectional bandwidth. Such links may be valuably applied to couple devices such as a deep learning and artificial intelligence hardware accelerator devices; high speed graphic processor units, tensor processor units, and other deep learning processors; high-speed memory; and other hardware in a variety of emerging computing applications, from deep learning applications, autonomous vehicles, robotics, and high performance memory architectures, among other examples. PCIe 6.0 further includes low-latency Forward Error Correction (FEC) and other features to improve bandwidth efficiency, while maintaining backward compatibility with previous PCIe generations and similar channel reach to what is available in PCIe 5.0.

In computing systems, a common architectural challenge is to achieve both power efficiency and operational performance. To pursue power efficiency, system entities (e.g., agents and associated circuitry and logic to implement layers in bus protocol stacks (e.g., layers of a PCIe, CXL, or UPI stack) are preferred to go to non-active low power states as quickly as possible to maximize power savings provided through such low power states. However, to pursue better operational performance, it is optimal for the specific system entities used by the system to perform a specific operation to be woken or activated as quickly as possible. Accordingly, operation performance and power efficiency may often be at odds.

This disclosure provides for the use of clock power management pins (or other auxiliary pins) in a protocol-specification-defined interconnect interface to be leveraged to send hints out-of-band with the data sent on the data links of the interface. Devices equipped with such interfaces may enable solutions to resolve at least some of the example issues above, among other example advantages. For instance, in one example implementation, the CLKREQ# pin of a PCIe interface may be utilized in at least some link states to send and receive hint data out-of-band and thereby bypass the dependency upon PCIe stack readiness to convey system hints between devices, including during low power substates (e.g. in connection with L1 substate exiting scenarios). Such implementations may provide a new option to have better trade-off between system power efficiency and performance when certain device needs to be woken up from deep low-power states, among other example uses.

In one example, a connection coupling PCIe CLKREQ# pins of two link partner devices may be repurposed or provided with a new additional mode (e.g., in addition to the traditionally defined clock power management function of CLKREQ) to convey information comprehended by application layer functions, entities, or other resources of the devices. For instance, such information may be sent as hints during a PCIe link low-power state wake-up period in association with bringing the PCIe link back up to an active L0 link state. Upon receiving the early hint information carried by CLKREQ#, without having to wait for readiness of PCIe stack, related application layer function entities can thereby start preparation for the respective upcoming actions, such as specific sub-block power state transition or necessary system requests initiation, even prior to the link being transitioned to the active link state. Such implementations, may provide options for communicating early hints between application layer entities connected by a corresponding PCIe link to process upcoming tasks during L1 substate exiting process, with both lower latency and more power-efficiency. For instance, such hints may prevent certain devices from unnecessarily waking up function blocks (e.g., example NAND/3D-Xpoint media dies, power-hungry network controller radio circuitry, etc.) for the upcoming tasks based on the early hints. Further, by utilizing an existing, defined auxiliary pin, such as CLKREQ# in PCIe, existing platforms that include such interfaces or ports may be extended with logic to enable such sideband message modes, with only the respective application layers of the devices needing to understand the specific messaging, handshakes, message arbitration, etc. that is utilized in data sent over the auxiliary channel, among other example features and advantages.

Figure 5:
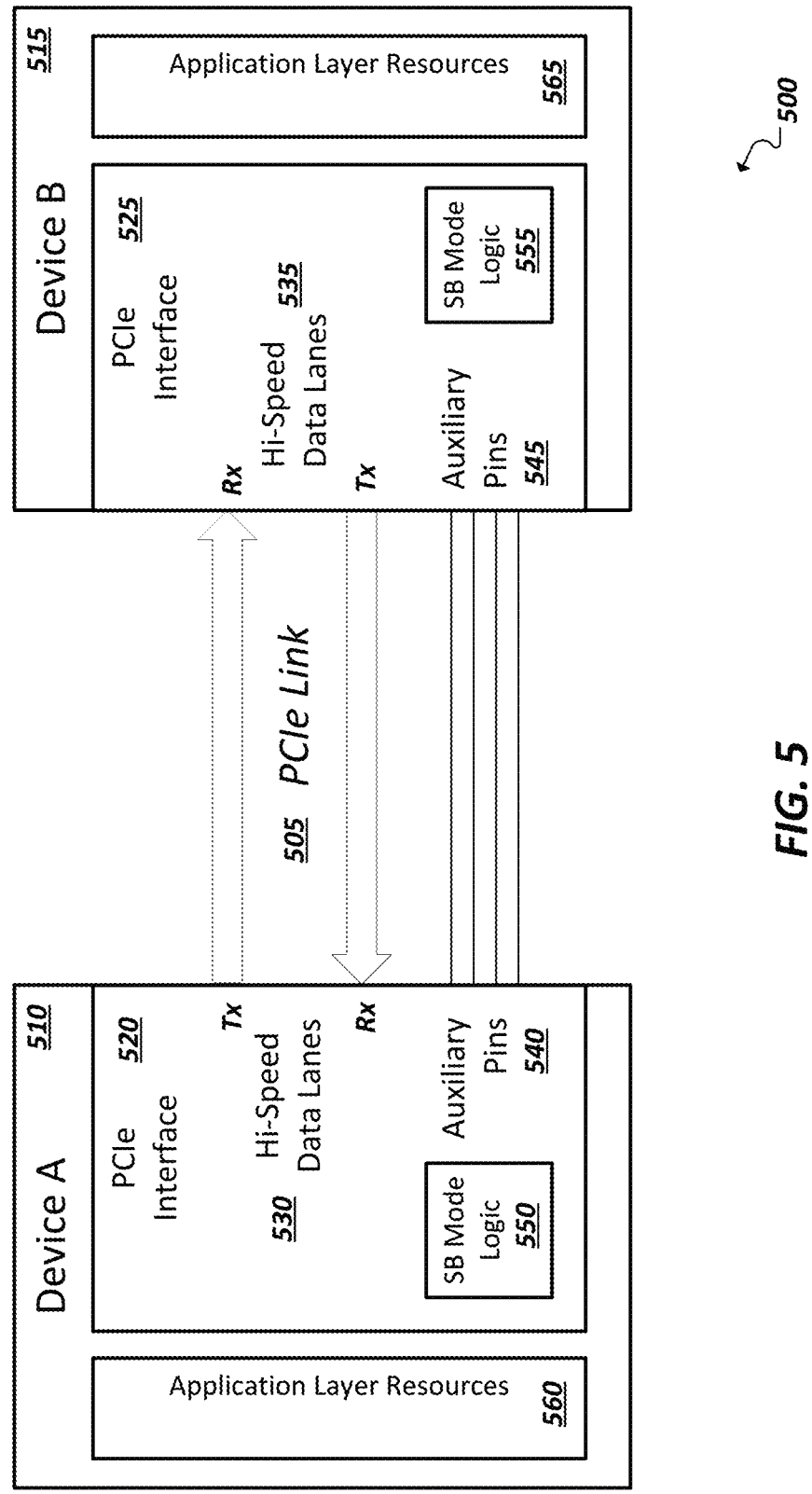
FIG. 5 illustrates a first device coupled to a second device by an example link.

Turning to FIG. 5, a simplified block diagram 500 is shown illustrating an example portion of a computing system including a first device 510 (e.g., a host device) coupled to a second device 515 (e.g., a graphics device, memory device, network controller, or other PCIe device) via a PCIe link 505. Each of the devices 510, 515 may be equipped with one or more ports, or interfaces (e.g., 520, 525), to support one or more connections to other devices (e.g., on the same or different die or package). The interface (e.g., 520, 525) may be constitute a collection of physical pins and supporting logic, implemented in hardware, firmware, and/or software to support the link 505, including logic to implement each one of a set of layers (e.g., logical PHY, data link layer, transaction layer, protocol layer, etc.) in a layered protocol stack of a corresponding interconnect protocol (e.g., PCIe, UPI, CXL, Gen-Z, Open CAPI, Infinity Fabric, etc.). The collection of pins for the interface (e.g., 520, 525) may be defined according to a protocol and may include a set of data pins to implement bidirectional, high-speed data lanes of the link, wherein in-band communications of the link are to be sent and received. Additional pins may also be defined to be included in the interface (e.g., 520, 525) according to the protocol for use in sending and/or receiving signals to perform supportive functions for the link according to the interconnect protocol.

In some implementations, an interface 520, 525 may be provided with sideband mode logic (e.g., 550, 555) to supplement the native or legacy functionality defined for one or more of the auxiliary pins (and corresponding connections) with support for sending and/or receiving sideband signals over the auxiliary pins. Such signals may be sent, for instance, in connection with an alternative operating mode defined for the pin and/or opportunistically during periods of inactivity on the auxiliary pin or link states where the traditional or native function of the auxiliary pins and signals are disabled, unexpected, or otherwise not in use, among other example use cases. The sideband mode logic 550, 555 may include logic to map messages, hints, or other data to be communicated in sideband signals to particular signal patterns, send such signals over the auxiliary connection, and receive and decode such signals sent from other devices over the auxiliary pins, among other example functionality. The respective link partner devices (e.g., 510, 515) may be equipped with transaction layer, application layer, or other higher layer logic (e.g., application layer resources 560, 565), which may drive or be dependent on communication activity over the link 505. Hints or other sideband messaging implemented by leveraging existing auxiliary pins of the interface (e.g., 520, 525) may be generated by and intended for delivery to such high layer logic, components, or resources. By so doing, such resources (e.g., 560, 565), which are normally reliant on an active link state or other particular link conditions, may send data out-of-band utilizing sideband channels implemented using existing auxiliary pins to help address latency and/or power issues for the system, among other example uses and benefits.

In one illustrative example, existing, defined PCIe interfaces and pins may be leveraged to repurpose one or more auxiliary pins for use in (e.g., occasional or modal) sideband signaling out-of-band with the data sent over the high-speed lanes of a PCIe link (e.g., 505) implemented using the PCIe interfaces (e.g., 520, 525) of two link partner devices (e.g., 510, 515). Auxiliary pins may be included to provide signaling, which supplements the signals that are required to transmit/receive data on a PCIe link, such as signals sent/received on auxiliary pins that may be necessary to implement the PCIe hierarchy within a system environment or to provide certain desired functions. Examples of such auxiliary signals (and corresponding pins included in a PCIe-compliant interface) include reference clock (e.g., REFCLK−/REFCLK+) pins, add-in card presence detect pins (e.g., PRSNT1# and PRSNT2#), a reset (e.g., PERST#) pin, a clock required (e.g., CLKREQ#) pin (e.g., to implement clock power management), Joint Test Action Group (JTAG) testing pin(s), a wake (e.g., WAKE#) pin (e.g., to support wakeup and/or the Optimized Buffer Flush/Fill (OBFF) mechanism), a Power Brake (PWRBRK#) pin, among other examples. Such pins (and others) may be leveraged and repurposed, using supporting logic (e.g., 550, 555), to support sideband signaling by application layer and other upper layer logic blocks and resources (e.g., 560, 565) to enhance the performance of a computing system.

In examples of typical power-constrained systems interconnected through a PCIe hierarchy, the majority of communication between linked devices depends on the readiness of a PCIe transaction layer to pass Transaction Layer Packet (TLPs) through the hierarchy. In such cases, it is almost always agents above the Transaction Layer (e.g., application layer logic) that generate and/or consume most TLPs. When a PCIe link is in a low-power link state (e.g., an L1 state or L1 substate (e.g., L1.1 or L1.2)), data transmission is halted, limiting the ability of system entities on either side of the link from conveying information to assist in realizing improved operation efficiency. For instance, if a certain application layer agent intends to convey information for a certain system operation via that link, the information (e.g., carried by TLP) cannot be conveyed until the link transitions back to active L0 state, which in turn may be dependent on other occurrence of other training and protocol specification requirements (e.g., transition to an L0 state in PCIe may first involve assertion of a clock required (e.g., a bidirectional open drain CLKREQ#) signal, for instance, via a transition from L1 to a Recovery state to the active L0 state).

Accordingly, it is inefficient, in terms of system latency, that an agent initiating activity has to wait for the L0-state establishment of a link in order to be able to pass information regarding the intention of the activity. Further, during the link-wake-up-to-active period, the application layer agents in other devices (that will eventually be receiving data from the initiating agent) are unaware of what (if any) upcoming tasks await them once the link is active. Accordingly, in the absence of system-level hints, devices will have to make all of their logic available upon the waking of a link to handle potentially any and all tasks they may be called on to perform upon PCIe L0 state entry in order to conform to system-level latency/performance rules, guidelines, or requirements. This results in unnecessary activity within certain components, agents, or functions, such as powering up storage media resources, activating radio frequency modules (e.g., in a wireless network controller), waking up other devices or initiating extra system requests, among other potentially wasteful activity.

In traditional PCIe systems, communicating out-of-band hints in the absence of a dedicated sideband interface (separate from the defined PCIe-compliant interface) is limited. For instance, while PCIe provides for using WAKE# to signal an Optimized Buffer Flush/Fill (OBFF), this and other mechanisms for providing hints on the PCIe interface are highly restricted in terms of use case and form factor and do not provide assistance in managing system tradeoffs between allocating extra power or latency budget for use cases that the system could have handled faster and/or more power-efficiently were there a better way to convey system hints prior to PCIe link readiness. As one simplified example, a particular system image (SI) on a host device may need to access a specific virtual function N in a deep-sleeping SSD device coupled to the host by a link while the link is in a low-power state (e.g., a L1.2 substate). In such an example, during the link-wake-up-to-L0 period, the SSD device traditionally wakes up all its functions to meet performance requirements due to a lack of knowledge of the host's intentions, despite only resources associated with function N being needed in connection with the link activation. In the presence of a hint, the SSD device could have instead identified a particular subset of its resources to activate in association with the specific task it was to perform upon the link activation (e.g., function N) based on the received hint, leaving the remaining resources of the SSD device (e.g., an unrelated media die) to reside in a light-sleep mode or other low power mode to save additional power, among other examples.

Figure 6A:
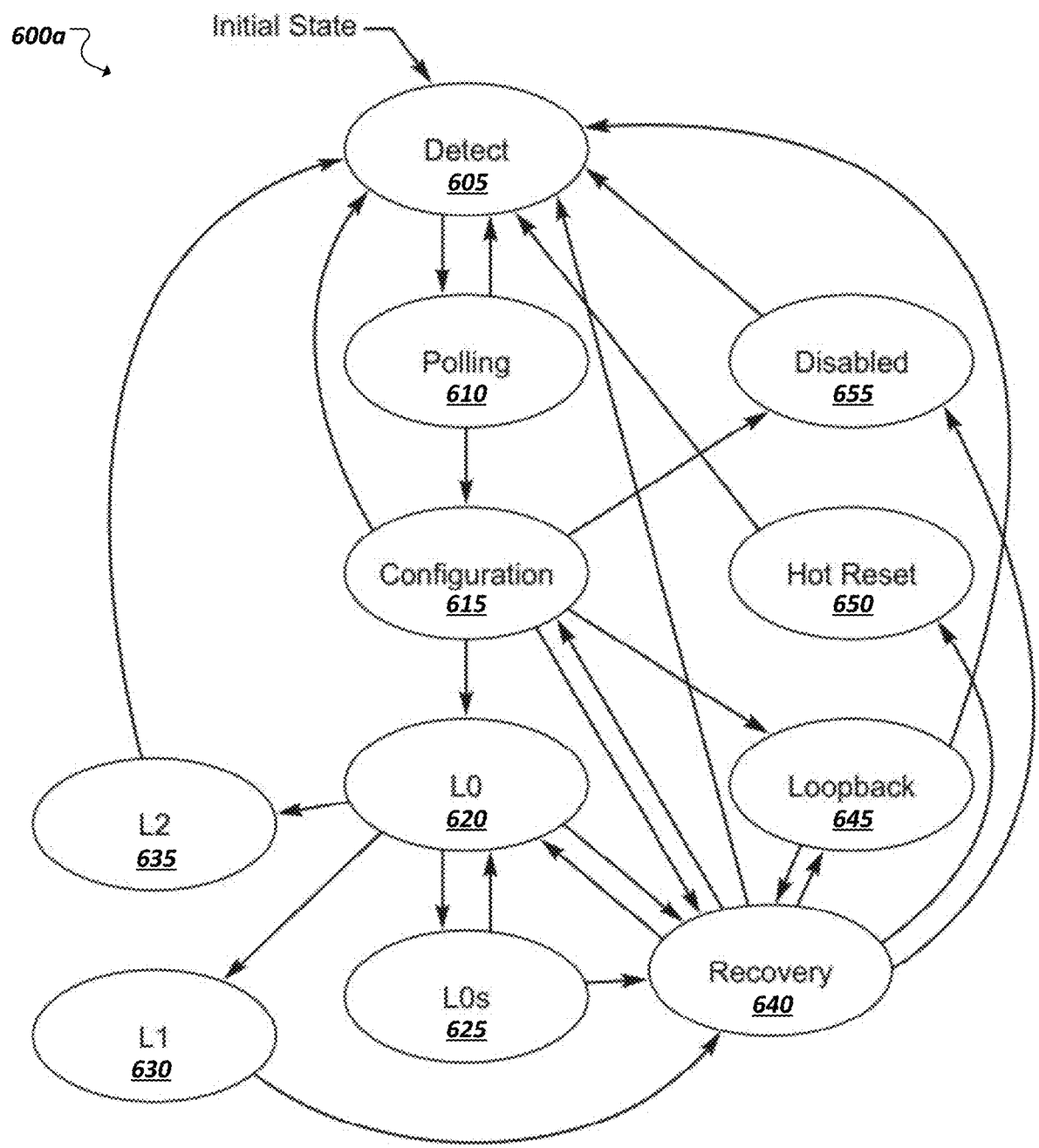

FIGS. 6A-6C illustrate portions of state machine diagrams, which may be utilized in connection with sideband messaging facilitated by repurposed auxiliary pins of a link interface. For instance, FIG. 6A illustrates a diagram 600a of a PCIe-based Link Training and Status State Machine (LTSSM).

The state machine may define a progression of link states to initiate and train a link to an active link state. The state machine may further define one or more low power or inactive link states, testing states, recovery, and other states. For instance, the progression may begin through a Detect state 605 The purpose of this state is to detect when a far end termination is present. Training states may include a Polling state 610 in which training ordered sets are communicated to establish bit lock, symbol lock, configure lane polarity, negotiate the data rate, and other attributes of the link. A Configuration state 615 may follow the Polling 610 state and involve both the transmitter and receiver sending and receiving data at the negotiated data rate to configure the lanes of a port into a link through a width and lane negotiation sequence. Configuration 615 may also be used to perform lane-to-lane de-skew, disable scrambling, among other training activities. A Recovery state 635 can be provided in which data is communicated using the configured link to change the data rate of operation if desired, re-establish bit lock, symbol lock or block alignment, and lane-to-lane de-skew, among other example e activities. Recovery 640 may also be used to enter the Loopback (645), Disabled (655), Hot Reset (650), and Configuration states (615). An L0 active state 620 may also be entered from the Recovery 635 state (or directly from the Configuration state 615) following training of the link. L0 620 is the normal operational state where data and control packets can be transmitted and received. All power management states may be defined to be entered from this state. For instance, an L0s state 625 may be provided as an active, power savings state (e.g., with the link set in a low power mode in one direction of the link only). L0s allows a link to quickly enter and recover from a power conservation state without going through Recovery 640. An L1 state 630 may serve as a low power state that allows an additional power savings over L0s at the cost of additional resume latency. The entry to L1 may occur after being directed by the Data Link Layer and receiving a particular ordered set (e.g., an electrical idle ordered set (EIOS)). As shown and discussed in FIGS. 6B-6C, L1 630 may include one or more sub-states. An L2 state 635 is another low-power link state in which power can be aggressively conserved by shutting off most of the transmitter and receiver devices' logic. Loopback 645 is intended for test and fault isolation, either on a per-lane or configured link basis. The Hot Reset state 650 is to allow a configured link and associated downstream device to be reset using in-band signaling. The Disabled state 655 is to allow a configured link to be disabled as long as directed or until electrical idle is exited, among other example link states.

FIG. 6B is a diagram 600b illustrating the substate machine for an example L1 state, including L1.Entry 630a and L1.Idle 630b. In L1. Entry 630a all configured transmitters are in electrical idle, with the DC common mode voltage held within a particular range. The link transitions to L1.Idle after a defined minimum timeout duration. In L1.Idle the transmitter remains in electrical idle. The DC common mode voltage is further held within specification, except as allowed by L1 power management (PM) substates (such as shown and described in connection with FIG. 6C. For instance, a substate of L1 is entered when the conditions for L1 PM substates are satisfied. The L1 PM substate is to be L1.0 when L1.Idle is entered or exited. If an exit from electrical idle is detected on any lane of a configured link, or directed after remaining in this substate for a minimum duration in speeds other than a first generation, or lowest, data rate (e.g., 2.5 GT/s), the link may transition to a Recovery state 640.

Turning to FIG. 6C, a diagram 600c is shown illustrating the state machine for L1 PM substates (or "L1 substates"), according to one example implementation. L1 substates (e.g., 660, 665, 670) establish a link power management regime that creates lower power substates of the L1 link state 630. For instance, an L1.0 substate 660 can correspond to the conventional L1 link state and is the substate entered whenever the link enters L1. The other substates (e.g., 665, 670) can be transitioned to from the L1.0 substate 660. In a L1.1 substate 665, link common mode voltages are maintained. In L1.1, the upstream and downstream ports are not required to be enabled to detect electrical idle exit. In a L1.2 substate, link common mode voltages are not required to be maintained and the upstream and downstream ports are not required to be enabled to detect electrical idle exit. Other additional low power features may be included in some implementations of L1 substates to enable further power savings at link partner devices.

As introduced above, principles such as those introduced herein may be applied to devices interconnected utilizing PCIe-based interconnects. A link may be defined on the physical connections between two ports of the link partner devices, with multiple wires or conductors coupling corresponding pins of the ports. High speed data may be sent on the conductors assigned to be data lanes of the link, while other conductors serve to provide clocking and auxiliary signaling. One or more of the auxiliary pin connection may be open drain connection and may be enabled to alternatively or optionally (when enabled) serve as a sideband channel between application layer agents in the respective link partner devices (e.g., a host device and a PCIe device) within a system (e.g., a board, system on chip (SoC), server, etc.), so that system hints can be passed early between the components before or during link state transitions (e.g., transitions from L1 substates). For instance, such hints may be sent prior to the link's entry into a high-speed active state, wherein TLPs, flits, or other quanta of data are sent between application layers of the link partner devices. In some implementations, the auxiliary channels may still be capable of being used for their traditional purpose, albeit with the additional sideband mode additionally supported. In some implementations, some existing restrictions defined for the auxiliary channel may be modified or ignored to enable the sideband signaling mode (e.g., in PCIe CLKREQ# toggling restrictions defined in earlier or current PCIe specification versions). In some instances, extended the signaling capabilities at a particular auxiliary pin and channel may be implemented as a proprietary extension or even adopted at the protocol specification level as part of platform power and efficiency optimization solutions, among other example implementations.

In some implementations, link partner devices may predefine the messages and/or protocol to be used over their shared auxiliary signal (e.g., CLKREQ signal). In one example, a clock power management auxiliary pin may be repurposed for the sending of sideband hints, such as a PCIe CLKREQ# pin. The CLKREQ# signal is an open drain, active low signal that is driven low to request that the PCIe reference clock be available (e.g., active clock state) to allow the PCIe interface to send/receive data. The CLKREQ# signal may be traditionally defined in PCIe for use in connection with a PCIe L1 state and L1 substates. For instance, all the devices sharing the same CLKREQ# signal may have a common agreement on how to interpret CLKREQ# signaling patterns, such as classes of hint patterns, L1 substates exiting patterns, etc. The common CLKREQ# pattern agreement may be established by specification, system construction, or upon system initialization, for instance, through a feature provision operation. Additionally, devices may access registers (e.g., capability registers) or receive system commands identifying that its link partner supports a sideband signaling mode on one or more specific auxiliary channels of a defined interface. For instance, in a PCIe interface, during enumeration, the "Subsystem Vendor ID Register" of the PCIe Device can be comprehended by a host as a way to identify a link partner device's capability to support the alternative sideband signaling mode, among other example implementations. Generally, a capability register or other data structure may be utilized to determine whether either or both link partner devices support the sideband signaling, to enable the sideband signaling, to define messaging or protocols for use on the sideband channel, to define states in which an auxiliary pin may be used for sideband signaling, or otherwise used to coordinate the configuration of devices for use and configuration of the sideband signaling mode, among other example implementations.

Figure 7:
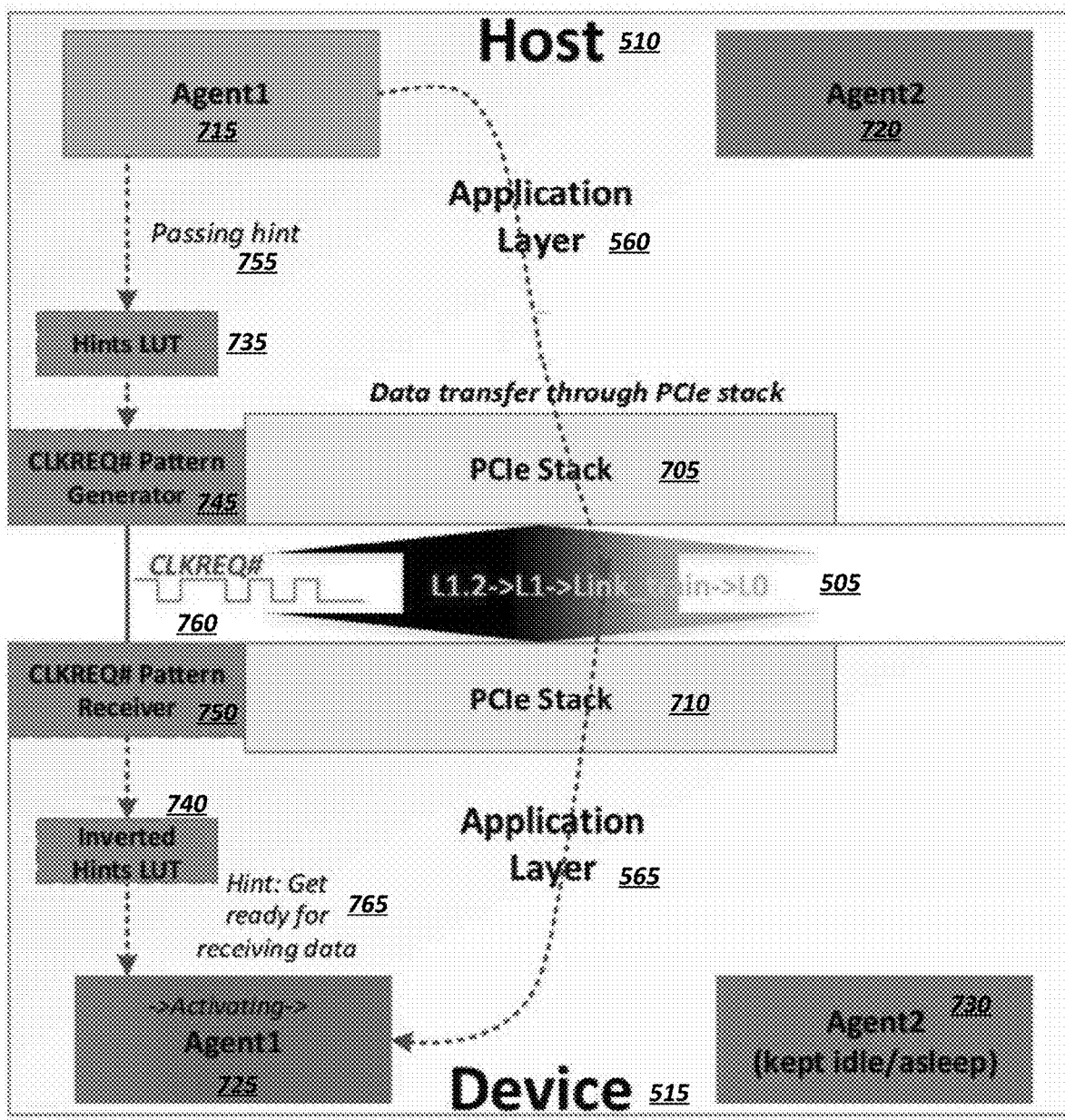
FIG. 7 is a simplified block diagram illustrating an example computing system including a first device coupled to a second device via respective interfaces.

FIG. 7 is a simplified block diagram 700 illustrating an example implementation of a PCIe interface used to couple a host system 510 to a PCIe device 515. The physical interface is present at each of the devices 510, 515, with data pins utilized to provide a high-speed link 505 composed of one or more data lanes according to a PCIe-based protocol. The PCIe interface may also be compliant with a PCIe-based protocol or standard and include a CLKREQ#, which enables a connection 702 coupling the respective CLKREQ# pins of devices 510, 515. To support the PCIe link 505, each of the ports of the link partner devices 510, 515 may include respective logic, implemented in hardware circuitry, firmware, and/or software, to implement a respective PCIe stack 705, 710. As discussed above, some devices may support a supplemental sideband mode enabling out-of-band information to be exchanged between application layers or other higher-level logic resources (e.g., 560, 565) of the devices 510, 515. In the example of FIG. 7, such resources may include logic blocks, applications, programs, supporting hardware, or other "agents" (e.g., 715, 720, 725, 730) within a device (e.g., 510, 515). Additionally, devices supporting such supplement sideband modes may further include logic (e.g., 735, 740, 745, 750) to enable an auxiliary pin (e.g., a PCIe CLKREQ# pin) to be repurposed for sending sideband signals over the interface (e.g., generated according to actions or requests of particular application layer or other resources (e.g., 715, 720, 725, 730) of the device) and/or receiving, interpreting, and acting upon such sideband signals.

In some implementations, logic to implement a supplemental sideband messaging mechanism may utilize look-up tables (LUTs) to define the specific messages, hints, or other information to specific signaling patterns that may be sent by one or both of the link partner devices 510, 515. For instance, a sending LUT may be defined, which a device may consult to convert a request or event (e.g., at an application layer resource) into one of the signals. A receiving, or inverted, LUT may also be defined and used to allow a device receiving a sideband signal to interpret the signal into data or information usable by the device and the resources that are to act upon the information. In other implementations, the mapping of signals to events may be statically defined within the logic itself. In one example, as illustrated in FIG. 7, upon system boot-up, an operating system (OS) or host driver (e.g., running on host device 510) can configure a sending Hints Look-Up Table (LUT) (e.g., 735) and a corresponding Inverted Hints LUT (e.g., 740) to setup the mapping of hints to CLKREQ# signal patterns properly. In other implementations, hint-and-pattern mapping may be static, potentially eliminating a need to perform such configuration of the LUT. In still other cases, sideband logic (e.g., 745, 750) utilized to generate and parse signals on the CLKREQ# channel may have a native understanding that certain signals indicate corresponding hits (e.g., without the use of a separate LUT structure), among other example implementations.

Continuing with the preceding example, the link 505 may be settled in a L1 substate (e.g., L1.2), for instance based on a power management event (e.g., an Active State Power Management (ASPM) event). While the link is in the low power state, a particular event may take place at the host system implicating a particular application layer agent (e.g., 715), such that the particular agent 715 is to pass some information to an application layer resource (e.g., device agent 725) of device 515 prior to the link being brought up to an active state. For instance, the event may be a certain application calling OS PCI driver for some actions, among other example events. Accordingly, a corresponding hint 755 may be determined by the host to correspond to this information and an associated CLKREQ# signal pattern may be identified, which corresponds to this hint. The CLKREQ# pattern generator 745 may then cause the selected signal pattern to be transmitted at the CLKREQ# pin of the host system's PCIe interface. For instance, in a binary signaling implementation, the pattern generator 745 may control the CLKREQ# open-drain signal assertion and de-assertion in a pre-defined clock frequency to generate the specific CLKREQ# pattern 760 corresponding to the early hint information to be sent to the device agent 725. At the device side, CLKREQ# pattern receiver logic 750 may demodulates the signal 760 sent by the host on the CLKREQ# pin of the device's PCIe interface based on the pre-defined clock frequency and feed it to the inverted hints LUT 740 to translate the pattern to the actual early hint information that the host passed to the device via the modified CLKREQ# sideband signal 760. In this example, the device 515 may interpret the signal and corresponding hint to determine that a particular subset of its resources, such as device agent 725, should get ready for receiving data on the soon to be awaked link 505. Accordingly, the device 515 may apply a corresponding power policy change or related data path wake-up to actively prepare device agent 725 (and potentially other associated device resources) actively prepared, including the normal PCIe L1.2 substate exiting. Once the active link state (e.g., L0) is reached agent 715 of the host 510 may pass data to the targeted (and pre-prepared) device agent 725 via TLPs on the high-speed data lanes of the link 505. Other data may be sent between the host 510 and device 515, including subsequent data that involves application layer resources, which were not originally targeted by the earlier host, before the link state transitions again, for instance, to another low power link state, among other examples.

In some instances, in the example above, some device resources (e.g., 720, 730) other than initiating and targeted agent (e.g., 715, 725) can be kept in a deep low power state with awareness of the related hint. Without the mechanism, during link wake-up and training, device agent 730 may have to be activated along with targeted agent 725 in order to process the possible range of tasks in a timely manner to meet certain system performance requirement, due to lack of the early hint. Further, as introduced above, in some implementations, sideband hint signaling over the CLKREQ# connection may be bidirectional, allowing another set of hints to be defined and implemented for the device 515 to pass early hints to the host 510, although CLKREQ#-based hints structure need not be symmetric between connected devices (e.g., with different LUT structures provided and configured for each direction of messaging between the devices), among other example features. For instance, in some implementations, an endpoint device (e.g., 515) could always be the receiver of the hints, and a host root complex (RC) (e.g., 510) could always be the sender of the hints within the system, while in other cases both devices may send and receive hints, among other example configurations.

In cases where hints may be sent bidirectionally, additional protocol mechanisms may be defined between the link partner device to arbitrate between messages and resolve potential race condition on CLKREQ# signal toggling. One example solution is that the initiating device can send a pre-toggling pattern out and monitor the CLKREQ# to ensure the other linked partner is not asserting CLKREQ#, before the real hint-related toggle pattern is sent out. In another example, windows (e.g., defined in shared clock time) may be predetermined in which either the host or the device may initiate sending of a hint (such that only one of the devices would ever initiate a hint within one of the defined time windows), among other example implementations. In some instances, a hint (or corresponding signal) may be sent, which the receiving device does not recognize or correctly understand. In such cases, the receiving device may effectively ignore the hint and choose to follow standard clock management or state transition policies (e.g., exiting the L1.2 substate by waking up all application layer entities), among other examples.

In addition to identifying a specific subset of resources to awaken or otherwise prepare, hints and information sent over a supplemental sideband signaling mechanism, such as described herein, may include potentially any information that may be of use to the application layers, power management, latency management, security, or other purpose. For instance, a variety of signals may be defined and signals may not necessarily be limited to transmission in certain windows or link states. Indeed, sideband signals may be advantageously used in some implementations to send messages during link training or state transitions that ordinarily make signaling between the devices difficult. In some implementations, an auxiliary signal which utilizes largely static signals (e.g., pulling high or low for extended durations) signals may be encoded on top of the static signal, for instance, using pulse amplitude modulation (PAM) or other signal modulation techniques. In other cases, windows for use of a particular auxiliary pin for sideband signaling may be limited to those windows where the native signaling over the auxiliary pin is expected to be idle or ignored, among other example implementations. Indeed, providers of devices may flexibly configure a potentially limitless array of signals to facilitate a similarly diverse array of purposes using a variety of different pins defined as auxiliary to the main in-band data transmission lanes of a protocol.

Figure 8A:
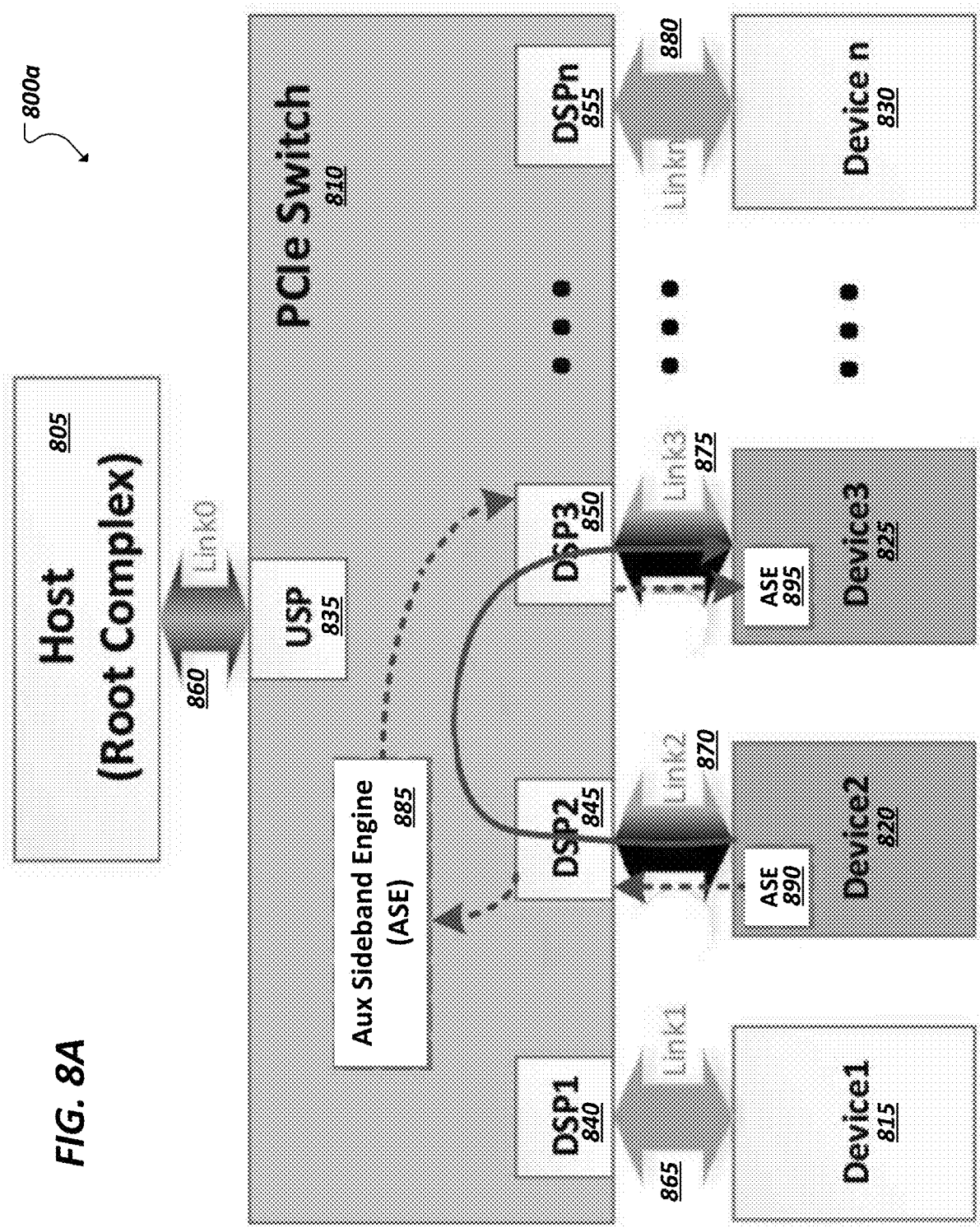
FIG. 8A is a simplified block diagram illustrating an example computing system including devices coupled by respective interfaces to a switch device.

In some systems, such as PCIe hierarchies, devices may communicate with another device in the hierarchy that is not directly connected, such as through a bridge, switch, retimer, or other intermediary device positioned between the two devices but permitting routing of PCIe traffic between the two devices. In such implementations, the auxiliary pin repurposed for sideband signaling, such as a PCIe CLKREQ# pin, may be coupled to the auxiliary pin of the intermediate device instead of with the auxiliary pin of the other device for which a hint or other sideband data is intended. As an example, a PCIe switch may be utilized to connect to multiple different devices over multiple PCIe links, with each PCIe link involving respective PCIe interfaces with respective CLKREQ# pins. FIG. 8A illustrates a block diagram showing an example of passing hints in a PCIe switch enabling peer-to-peer (P2P) or multicast data transportation. For instance, PCIe switch device 810 may interconnect multiple downstream devices (e.g., 815, 820, 825, 830) with a host device (e.g., 805). The switch 810 may couple o the host 805 via an upstream port (USP) 835 and couple to the downstream devices (e.g., 815, 820, 825, 830) via downstream ports (DSPs) 865, 870, 875, 880. Each of the ports (e.g., 835, 865, 870, 875, 880) may be a PCIe-compliant port with corresponding pins and logic to support a PCIe interface, including respective sets of auxiliary pins. Respective PCIe compliant links (e.g., 860, 865, 870, 875, 880) may be established between the switch 810 and the connected devices (e.g., 805, 815, 820, 825, 825, 830) over the respective PCIe interfaces of the devices.

In order to support the sending of sideband signals over auxiliary pins of the switch ports (e.g., 835, 865, 870, 875, 880), the switch 810 may include an auxiliary sideband engine (ASE) 885, with logic implemented in hardware circuitry, firmware, and/or software, to support not only sideband signaling over the individual auxiliary pins (e.g., CLKREQ#pins) of one or more of the switch's ports, but to also route sideband signaling within the switch to the appropriate port. In some implementations, each of the ports 835, 865, 870, 875, 880 of the switch 820 may be configured to optionally support such sideband signaling (e.g., with respective sideband signal generation logic, LUTs, and other logic provided at each of the ports). When another device (e.g., 820, 825) also supports sideband signaling and is equipped with corresponding enhanced logic (e.g., ASE modules 890, 895), corresponding ports (e.g., 870, 875) of the switch 810 may be configured to enable the sideband signaling mode.

In the example of FIG. 8A, provided that a P2P-capable PCIe switch component 810 and two (or more) of its downstream components (e.g., 820, 825), are equipped with logic to support sideband signaling over their respective CLKREQ# pin, sideband data, such as L1 exit hints, may be transmitted between the downstream devices 820, 825 over the PCIe switch 810. In one example, the ASE logic (e.g., 885, 890, 895) may be implemented in hardware, firmware, and/or software and related data structures or memory to include a hints LUT, Inverted hints LUT, and CLKREQ# pattern generator/receiver, such as discussed above, among other additional or alternative logic utilized to facilitate signaling over the CLKREQ# pin and parse and act upon sideband data received at the CLKREQ# pin. In one example, after the whole hierarchy is idling for long enough, every link (e.g., 860, 865, 870, 875, 880) may settle into (e.g., be sent into) a low power state (e.g., ASPM L1.2). Subsequently, if P2P traffic is to be initiated by one device (e.g., 820) to another device (e.g., 825), in one example, device 820 may utilize its CLKREQ# pin to send an early hint with a specific CLKREQ# signaling pattern to first tell the switch 810 that a request specifically targeting device 825 will be arriving from device 820. While the port 845 connecting the switch 810 to device 820 is waking up from the low power state, the switch 810 receives the sideband hint pattern over the CLKREQ# connection sent by device 820, and decodes it using its auxiliary sideband engine logic (e.g., 885). The switch's auxiliary sideband signaling logic 885 may then generate early hint data for device 825 based on the hint it received from device 820, and cause the corresponding signal to be generated at the CLKREQ# pin of port 850 to pass the early hint data to device 825 over the CLKREQ# channel connecting the CLKREQ# pins of the switch 810 and device 825. The switch 810 may additionally begin the process for transitioning the corresponding port 850 from the low power state to an active state. Accordingly, prior to or during the waking up of the link 875, device 825 may receive and interpret the hint telling device 825 that device 820 will be sending a P2P request. When the link 870 coupling device 820 to the switch 810 is transitioned to an active (e.g., L0) state, device 820 may begin sending the P2P mainstream TLPs. Similarly, once link 875 is brought to L0, the switch 810 can forward the P2P TLPs originating from device 820 to device 825.

Figure 8B:
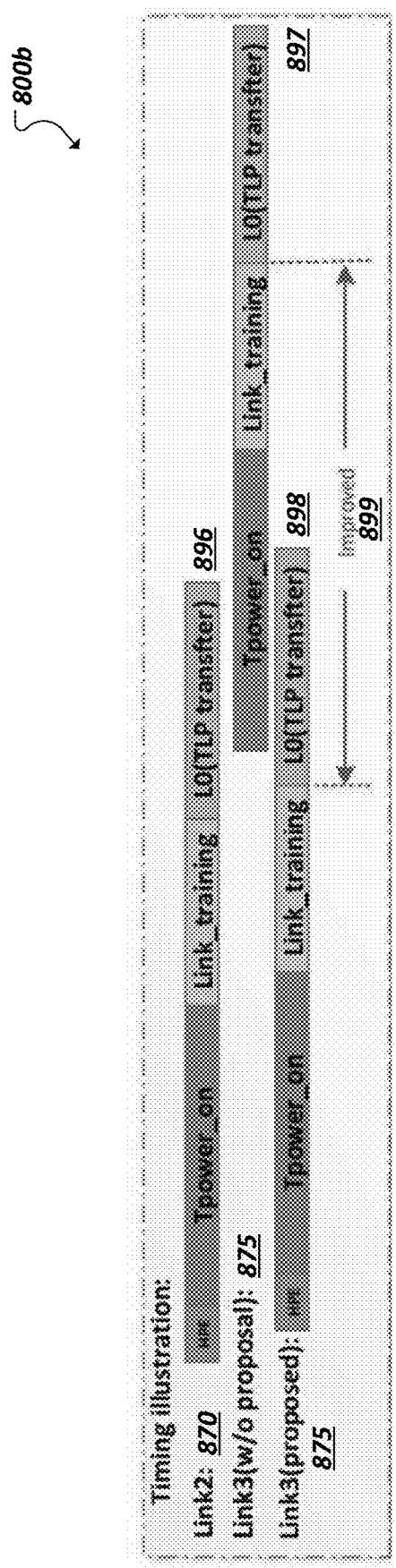
FIG. 8B illustrate example timing techniques associated with the example system of FIG. 8A.

Turning to FIG. 8B, timing diagrams 896-898 are shown illustrating the comparable latency improvements, which may be achieved in examples such as that shown and described in connection with FIG. 8A. As shown, latency improvement 899 is achieved through sideband hints allowing both link 870 and link 875 overlapping their link wake-up and training phases in parallel (as shown in timing diagrams 896 and 898) instead of in a serial manner (as shown in timing diagrams 896 and 897) as according to traditional PCIe wake protocols. In some implementations, the process of CLKREQ#-based-hint extraction can be as fast as several clock cycles. In the example of FIG. 8A, the illustration assumes that has an assumption that PCIe Access Control Services (ACS) P2P Request/Completion Redirect is not enabled. In other examples, these features may be enabled, resulting in potentially even more benefit to the system by way of latency improvement, as link 875 would be woken up even later without the use of sideband hints, because the TLPs would be redirected to the host before being routed to port 850 to wake up the link 875. Still other example architectures (e.g., using bridges, retimers and other channel extenders, etc.) may utilize similar principles, allowing auxiliary pins common to the interfaces of the interconnected devices to be leveraged to enable sideband hints to be sent and forwarded from one device to a target device over the interconnect hierarchy, among other example implementations.

As discussed above, meaningful reductions in latency may be achieved through the sideband messaging solutions discussed above, as well as enhancing power saving benefits of low power states and modes of operation. For instance, as an illustration of the potential latency reduction that may be achieved through the utilization of sideband hints during PCIe L1 substate exiting, based on standard PCI Express Base Specification Revision 4.0 Version 1.0, if the proposed early hints are employed during, for example, the L1.2 substate, the early hint is received before the receiving device LTSSM enters L0. Therefore, at least the time spent on L1.2 wakeup and Recovery is saved for the receiving device that is to receive the hint (e.g., over CLKREQ#), with only a relatively small amount of additional time used to process CLKREQ# decoding. Otherwise, in order to determine the precise response to the link wake-up event, the receiving device would have to wait until L0 state is entered and the first TLP is received. As an illustrative example, Table 1 illustrates a potential time-saving breakdown for use of CLKREQ# signaling hints in an example system implementing traditional PCIe link activation procedures. It should be appreciated that the example shown in Table 1 is but one example use case, and other timesaving values may be achieved in other system implementations.

TABLE 1

Example Minimum Latency Improvement Benefits

| PCIe Speed | Options of Tpower_on time saved (S1) | 16-bit CLKREQ# pattern sending penalty (with auxiliary clock frequency as 25 MHz) (P) | Minimum Recovery- >L0 Time saved (S2) | Minimum Latency reduced for the receiving device to react precisely (S1 + S2 − P) |
|---|---|---|---|---|
| Gen1 (2.5 GHz) | 2 μs (Minimum Tpower_on per PCIe SPEC) | 640 ns | 512 ns | 1.872 μs |
| Gen1 (2.5 GHz) | 100 μs | 640 ns | 512 ns | 99.872 μs |
| Gen2 (5 GHz) | 2 μs | 640 ns | 256 ns | 1.616 μs |
| Gen2 (5 GHz) | 100 μs | 640 ns | 256 ns | 99.616 μs |
| Gen3 (8 Ghz) | 2 μs | 640 ns | 138 ns | 1.498 μs |
| Gen3 (8 Ghz) | 100 μs | 640 ns | 138 ns | 99.498 μs |
| Gen4 (16 GHz) | 2 μs | 640 ns | 69 ns | 1.429 μs |
| Gen4 (16 GHz) | 100 μs | 640 ns | 69 ns | 99.429 μs |
| Gen5 (32 GHz) | 2 μs | 640 ns | 34.5 ns | 1.394 μs |
| Gen5 (32 GHz) | 100 μs | 640 ns | 34.5 ns | 99.394 μs |

FIG. 9A is a flowchart 900a illustrating an example technique for using an auxiliary pin of a defined interface for sending sideband messages. For instance, an event may be identified 905 involving or triggered by a particular application layer component or resource of a particular device. For instance, the component or resource may be a particular command, thread, or function (e.g., of application software) that is to use at least one subcomponent of another device coupled to the particular device. A hint may be generated 910, for instance, using interface logic of the particular device, based on the event that is intended for the particular subcomponent or resource of the other device (or a component managing the particular subcomponent on the other device). A sideband signal may be sent 915 to include or otherwise indicate the hint to the other device, where the sideband signal is sent over an auxiliary pin of the interface, which is repurposed beyond its natively defined function or signal set. For instance, an auxiliary pin that is defined for use in sending a particular set of signals in support of high speed signaling on data pins of the interface, may be repurposed (e.g., modally or temporarily) for the sending of the sideband signal from the particular device to the other device (e.g., modulated on top of the particular set of signals, while the particular set of signals are not used by the system, or when the auxiliary pin is idle and not in use, among other example opportunities) to communicate the hint to the particular subcomponent of the other device.

Turning to FIG. 9B, a simplified flow diagram 900b is shown illustrating an example technique for receiving and using sideband signals sent on a repurposed auxiliary connection. For instance, an auxiliary connection may be natively defined to be a connection between a particular auxiliary pin of a defined interface on a first device and a corresponding particular auxiliary pin on another second device's interface for sending a defined set of signals (e.g., according to an interconnect protocol specification). The interfaces of the first and second devices are used to support a high-speed data link coupling the first and second devices, with the set of signals defined for the auxiliary connection for use in supporting the high-speed data link according to a protocol. In this example, enhanced logic may be provided on each of the first and second devices to enable sideband messaging over the auxiliary connection, thereby repurposing the auxiliary pins and auxiliary connection for sideband signaling beyond that natively defined in the protocol. Accordingly, the repurposed auxiliary pin may be monitored 920 on one (or both) of the link partner devices for sideband signals. A particular sideband signal may be received 925 and decoded 930 to identify information intended for the receiving device, such as a hint. A particular subcomponent (e.g., an application layer component) of the receiving device may be determined as a target of the sideband signal information and the information may be directed 935 to the targeted subcomponent. The subcomponent may then advantageously use the sideband information to realize selective power management of components of the device, decrease latency on the link, among other example benefits and uses.

Note that the apparatus', methods', and systems described above may be implemented in any electronic device or system as aforementioned. As specific illustrations, the figures below provide exemplary systems for utilizing the concepts as described herein. As the systems below are described in more detail, a number of different interconnects are disclosed, described, and revisited from the discussion above. And as is readily apparent, the advances described above may be applied to any of those interconnects, fabrics, or architectures.

Figure 10:
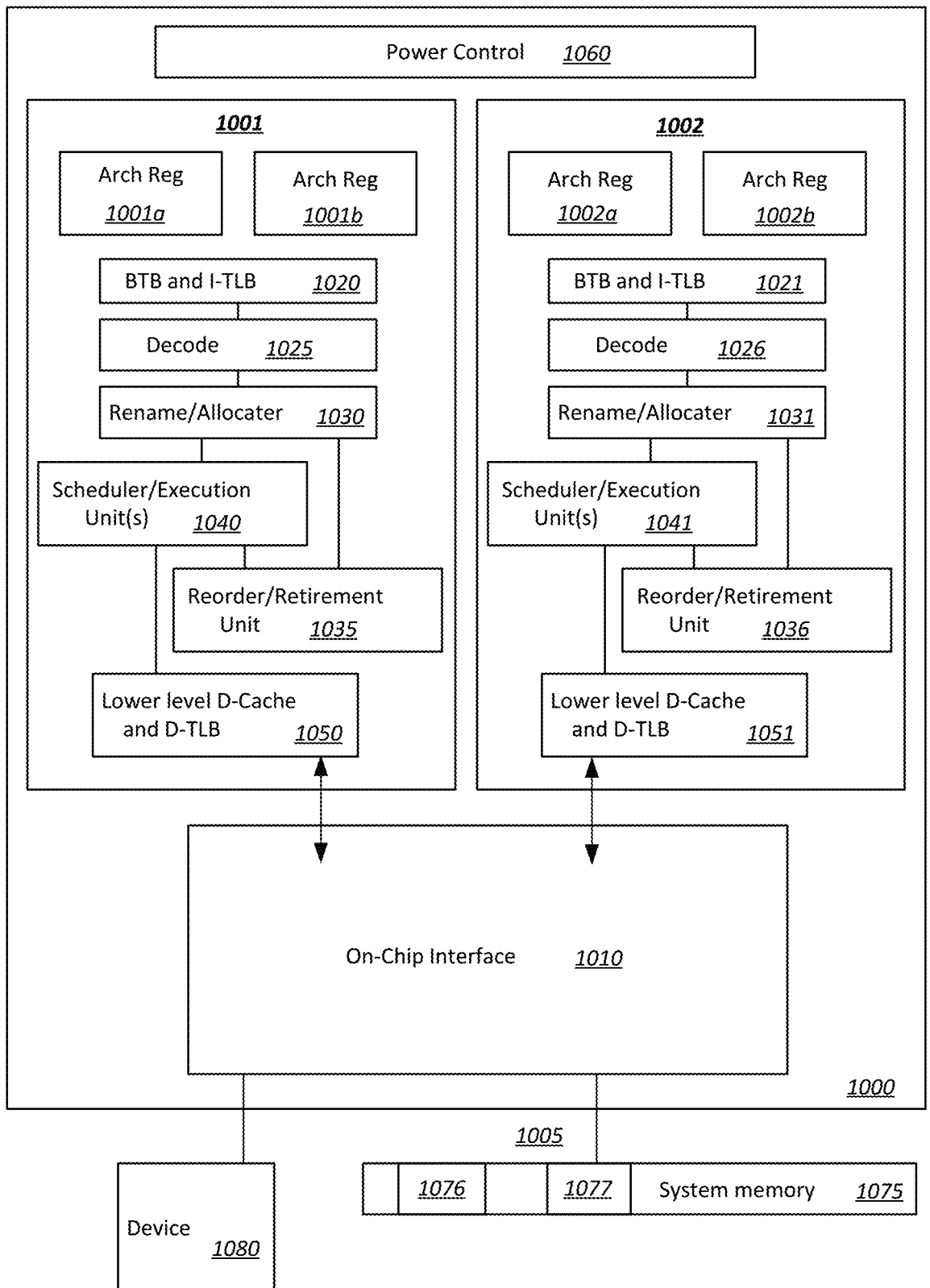
FIG. 10 illustrates an embodiment of a block diagram for a computing system including a multicore processor.

Referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores—core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1000, as illustrated in FIG. 10, includes two cores—core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (e.g., 1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1015, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further way from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 1010 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example, in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 11:
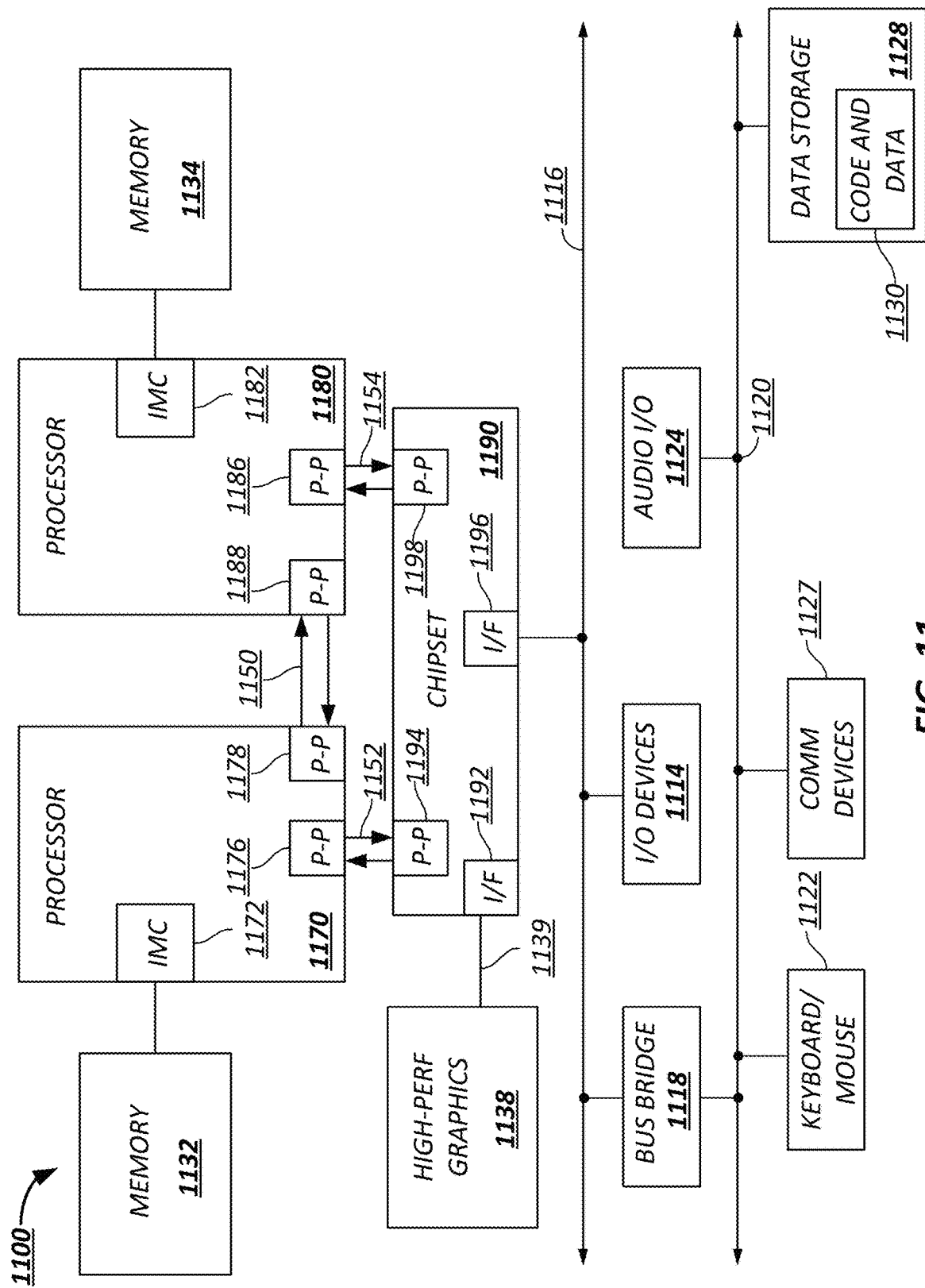
FIG. 11 illustrates another embodiment of a block diagram for a computing system.

Referring now to FIG. 11, shown is a block diagram of a second system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller unit point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

Computing systems can include various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the solutions described above may be implemented in any portion of one or more of the interconnects illustrated or described below.

A processor, in one embodiment, includes a microprocessor, multi-core processor, multithreaded processor, an ultra-low voltage processor, an embedded processor, or other known processing element. In the illustrated implementation, processor acts as a main processing unit and central hub for communication with many of the various components of the system. As one example, processor is implemented as a system on a chip (SoC). As a specific illustrative example, processor includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instruction set that performs defined algorithms as set forth by the processor licensor. Here, the microarchitectural implementation may vary, but the architectural function of the processor is usually consistent. Certain details regarding the architecture and operation of processor in one implementation will be discussed further below to provide an illustrative example.

Processor, in one embodiment, communicates with a system memory. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage may also couple to processor. In various embodiments, to enable a thinner and lighter system design as well as to improve system responsiveness, this mass storage may be implemented via an SSD. However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may be coupled to processor, e.g., via a serial peripheral interface (SPI). This flash device may provide for non-volatile storage of system software, including a basic input/output software (BIOS) as well as other firmware of the system.

In various embodiments, mass storage of the system is implemented by an SSD alone or as a disk, optical or other drive with an SSD cache. In some embodiments, the mass storage is implemented as an SSD or as an HDD along with a restore (RST) cache module. In various implementations, the HDD provides for storage of between 320 GB-4 terabytes (TB) and upward while the RST cache is implemented with an SSD having a capacity of 24 GB-256 GB. Note that such SSD cache may be configured as a single level cache (SLC) or multi-level cache (MLC) option to provide an appropriate level of responsiveness. In an SSD-only option, the module may be accommodated in various locations such as in a mSATA or NGFF slot. As an example, an SSD has a capacity ranging from 120 GB-1 TB.

Various peripheral devices may couple to processor via a low pin count (LPC) interconnect. In the embodiment shown, various components can be coupled through an embedded controller. Such components can include a keyboard (e.g., coupled via a PS2 interface), a fan, and a thermal sensor. In some embodiments, touch pad may also couple to EC via a PS2 interface. In addition, a security processor such as a trusted platform module (TPM) in accordance with the Trusted Computing Group (TCG) TPM Specification Version 1.2, dated Oct. 2, 2003, may also couple to processor via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full-size SD-XC card reader and/or a SIM card reader for WWAN (e.g., an 8-pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System can communicate with external devices in a variety of manners, including wirelessly. In some instances, various wireless modules, each of which can correspond to a radio configured for a particular wireless communication protocol, are present. One manner for wireless communication in a short range such as a near field may be via a near field communication (NFC) unit which may communicate, in one embodiment with processor via an SMBus. Note that via this NFC unit, devices in close proximity to each other can communicate. For example, a user can enable system to communicate with another (e.g.) portable device such as a smartphone of the user via adapting the two devices together in close relation and enabling transfer of information such as identification information payment information, data such as image data or so forth. Wireless power transfer may also be performed using an NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

Further, additional wireless units can include other short-range wireless engines including a WLAN unit and a Bluetooth unit. Using WLAN unit, Wi-Fi™ communications in accordance with a given Institute of Electrical and Electronics Engineers (IEEE) 802.11 standard can be realized, while via Bluetooth unit, short range communications via a Bluetooth protocol can occur. These units may communicate with processor via, e.g., a USB link or a universal asynchronous receiver transmitter (UART) link. Or these units may couple to processor via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit which in turn may couple to a subscriber identity module (SIM). In addition, to enable receipt and use of location information, a GPS module may also be present. WWAN unit and an integrated capture device such as a camera module may communicate via a given USB protocol such as a USB 2.0 or 3.0 link, or a UART or I²C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition, NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high-resolution camera, e.g., having a resolution of at least 2.0 mega pixels (MP) and extending to 6.0 MP and beyond.

To provide for audio inputs and outputs, an audio processor can be implemented via a digital signal processor (DSP), which may couple to processor via a high definition audio (HDA) link. Similarly, DSP may communicate with an integrated coder/decoder (CODEC) and amplifier that in turn may couple to output speakers which may be implemented within the chassis. Similarly, amplifier and CODEC can be coupled to receive audio inputs from a microphone which in an embodiment can be implemented via dual array microphones (such as a digital microphone array) to provide for high quality audio inputs to enable voice-activated control of various operations within the system. Note also that audio outputs can be provided from amplifier/CODEC to a headphone jack.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While the concepts above have been described with respect to a limited number of embodiments, those skilled in the art will appreciate numerous modifications and variations therefrom. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to embodiments in accordance with this Specification. Example 1 is an apparatus including: an interface to couple to another device over an interconnect link, where the interface includes: a set of data lane pins to support high speed data communication on the interconnect link based on an interconnect protocol; and an auxiliary pin to support a clock power management signal defined by the interconnect protocol; and logic to: generate hint data for use by the other device; and send the hint data as a sideband signal to the other device over the auxiliary pin, where the sideband signal is distinct from the clock power management signal.

Example 2 includes the subject matter of example 1, where the auxiliary pin is used in a clock power management mode, the sideband signal is to be sent in a different particular mode, and the logic is to select either the clock power management mode or the particular mode to govern signaling on the auxiliary pin.

Example 3 includes the subject matter of example 2, where the sideband signal is sent while in the particular mode, and the logic is to: switch from the particular mode to the clock power management mode; and use the auxiliary pin to send the clock power management signal during the clock power management mode.

Example 4 includes the subject matter of any one of examples 1-3, where the interface is compliant with a Peripheral Component Interconnect Express (PCIe) standard and the interconnect protocol includes a PCIe-based protocol.

Example 5 includes the subject matter of example 4, where the auxiliary pin includes a CLKREQ# pin defined by the PCIe standard.

Example 6 includes the subject matter of any one of examples 4-5, where the interconnect link is to include a plurality of lanes, and the set of data lane pins includes a respective transmitter pin and a respective receiver pin for each one of the plurality of lanes.

Example 7 includes the subject matter of any one of examples 4-6, where the PCIe protocol defines an L1 low power state, the L1 low power state includes a plurality of L1 substates, and the hint data is to be used in association with an exit from a particular one of the plurality of L1 substates.

Example 8 includes the subject matter of example 7, where the particular L1 substate includes a L1.1 substate.

Example 9 includes the subject matter of any one of examples 1-8, where the hint data is to identify an action to be taken by the other device is association with a link state of the interconnect link.

Example 10 includes the subject matter of any one of examples 1-9, where the apparatus is one of a host processor device or an endpoint device.

Example 11 includes the subject matter of any one of examples 1-10, where the logic includes hardware circuitry.

Example 12 includes the subject matter of any one of examples 1-11, where the logic includes software.

Example 13 is an apparatus including: an interface to couple to a second device over a link to be established using the interface, where the interface includes: a set of data pins to support high speed data communication on the link based on an interconnect protocol; and an auxiliary pin separate from the set of data pins to support the link based on the interconnect protocol, where the interconnect protocol defines a set of protocol-defined signals to be communicated on the auxiliary pin; and logic to: monitor the auxiliary pin for a sideband signal in a set of sideband signals, where the set of sideband signal are outside the set of protocol-defined signals; and interpret the sideband signal as intended for a particular subcomponent of the apparatus; and send information to the particular subcomponent based on the sideband signal.

Example 14 includes the subject matter of example 13, where the information causes the particular subcomponent to be selectively activated, and other subcomponents of the apparatus are to remain in an inactive state during activation of the particular subcomponent.

Example 15 includes the subject matter of any one of examples 13-14, where the set of protocol-defined signals are to be used for clock power management.

Example 16 includes the subject matter of example 15, where the auxiliary pin includes a PCIe CLKREQ# pin.

Example 17 includes the subject matter of any one of examples 15-16, where the auxiliary pin is used in a clock power management mode, the sideband signal is to be sent in a different particular mode, and the logic is to select either the clock power management mode or the particular mode to govern signaling on the auxiliary pin.

Example 18 includes the subject matter of example 17, where the sideband signal is sent while in the particular mode, and the logic is to: switch from the particular mode to the clock power management mode; and use the auxiliary pin to send the clock power management signal during the clock power management mode.

Example 19 includes the subject matter of any one of examples 13-18, further including a plurality of application layer resources and the particular subcomponent includes one of the plurality of application layer resources.

Example 20 includes the subject matter of any one of examples 13-19, where the particular subcomponent includes a particular block of hardware of the apparatus.

Example 21 includes the subject matter of any one of examples 13-20, where the interface is compliant with a Peripheral Component Interconnect Express (PCIe) standard and the interconnect protocol includes a PCIe-based protocol.

Example 22 includes the subject matter of example 21, where the interconnect link is to include a plurality of lanes, and the set of data lane pins includes a respective transmitter pin and a respective receiver pin for each one of the plurality of lanes.

Example 23 includes the subject matter of any one of examples 21-22, where the PCIe protocol defines an L1 low power state, the L1 low power state includes a plurality of L1 substates, and the hint data is to be used in association with an exit from a particular one of the plurality of L1 substates.

Example 24 includes the subject matter of example 23, where the particular L1 substate includes a L1.1 substate.

Example 25 includes the subject matter of any one of examples 13-24, where the hint data is to identify an action to be taken by the other device is association with a link state of the interconnect link.

Example 26 includes the subject matter of any one of examples 13-25, where the apparatus is one of a host processor device or an endpoint device.

Example 27 includes the subject matter of any one of examples 13-26, where the logic includes hardware circuitry.

Example 28 includes the subject matter of any one of examples 13-27, where the logic includes software.

Example 29 is a system including: a first device including a first interface; a second device including a second interface, where the first and second devices are coupled via the first and second interfaces, each of the first and second interfaces include respective data pins to support lanes of a high speed data link based on an interconnect protocol, each of the first and second interfaces further include a respective auxiliary pin to support a clock power management signal, and the auxiliary pin of the first device is connected to the auxiliary pin of the second device to form an auxiliary connection, where the second device further includes auxiliary sideband logic to: generate hint data; and send the hint data as a sideband signal to the first device over the auxiliary connection, where the sideband signal is distinct from the clock power management signal.

Example 30 includes the subject matter of example 29, where the sideband signal includes a first sideband signal, the first device includes further auxiliary sideband logic to: generate a second sideband signal to communicate out-of-band information to the second device; and send the second sideband signal to the second device over the auxiliary connection, where the second sideband signal is distinct from the clock power management signal.

Example 31 includes the subject matter of any one of examples 29-30, further including a third device, where the first device includes a switch coupled to both the second device and the third device, the hint data is intended for the third device, the sideband signal identifies that the third device is a target of the hint data, and the first device is to forward the hint data to the third device.

Example 32 includes the subject matter of any one of examples 29-31, where each of the first and second interfaces are compliant with a PCIe-based protocol, the auxiliary pin includes a PCIe CLKREQ# pin, and the sideband signal is outside signals defined by the PCIe-based protocol.

Example 33 includes the subject matter of any one of examples 29-32, where the first device includes an endpoint device and the second device includes a host device.

Example 34 includes the subject matter of any one of examples 29-32, where the first device includes a host device and the second device includes an endpoint device.

Example 35 includes the subject matter of any one of examples 29-34, where the interconnect protocol includes one of PCIe or Compute Express Link (CXL).

Example 36 includes the subject matter of any one of examples 29-35, further including a capability register to identify whether sideband signaling is supported by the first or second device or whether the auxiliary pin connection is limited to communicating the clock power management signal.

Example 37 includes the subject matter of any one of examples 29-36, where the auxiliary pin is used in a clock power management mode, the sideband signal is to be sent in a different particular mode, and the logic is to select either the clock power management mode or the particular mode to govern signaling on the auxiliary pin.

Example 38 includes the subject matter of example 37, where the sideband signal is sent while in the particular mode, and the auxiliary sideband logic is to: switch from the particular mode to the clock power management mode; and use the auxiliary pin to send the clock power management signal during the clock power management mode.

Example 39 includes the subject matter of any one of examples 29-38, where the interface is compliant with a Peripheral Component Interconnect Express (PCIe) standard and the interconnect protocol includes a PCIe-based protocol.

Example 40 includes the subject matter of example 39, where the interconnect link is to include a plurality of lanes, and the set of data lane pins includes a respective transmitter pin and a respective receiver pin for each one of the plurality of lanes.

Example 41 includes the subject matter of any one of examples 39-40, where the PCIe protocol defines an L1 low power state, the L1 low power state includes a plurality of L1 substates, and the hint data is to be used in association with an exit from a particular one of the plurality of L1 substates.

Example 42 includes the subject matter of example 41, where the particular L1 substate includes a L1.1 substate.

Example 43 includes the subject matter of any one of examples 29-42, where the hint data is to identify an action to be taken by the other device is association with a link state of the interconnect link.

Example 44 includes the subject matter of any one of examples 29-43, where the auxiliary sideband logic includes hardware circuitry.

Example 45 includes the subject matter of any one of examples 29-44, where the auxiliary sideband logic includes software.

Example 46 is a method including: generating hint data, at a first device, for use by a second device, where the first device couples to the second device by an interface, the interface includes a set of data lane pins to support high speed data communication on the interconnect link based on an interconnect protocol and an auxiliary pin to support a clock power management signal defined by the interconnect protocol; and sending the hint data as a sideband signal to the other device over the auxiliary pin, where the sideband signal is distinct from the clock power management signal.

Example 47 includes the subject matter of example 46, where the auxiliary pin is used in a clock power management mode, the sideband signal is to be sent in a different particular mode, and the method further includes selecting either the clock power management mode or the particular mode to govern signaling on the auxiliary pin.

Example 48 includes the subject matter of example 47, where the sideband signal is sent while in the particular mode, and the method further including: switching from the particular mode to the clock power management mode; and using the auxiliary pin to send the clock power management signal during the clock power management mode.

Example 49 includes the subject matter of any one of examples 46-48, where the interface is compliant with a Peripheral Component Interconnect Express (PCIe) standard and the interconnect protocol includes a PCIe-based protocol.

Example 50 includes the subject matter of example 49, where the auxiliary pin includes a CLKREQ# pin defined by the PCIe standard.

Example 51 includes the subject matter of any one of examples 49-50, where the interconnect link is to include a plurality of lanes, and the set of data lane pins includes a respective transmitter pin and a respective receiver pin for each one of the plurality of lanes.

Example 52 includes the subject matter of any one of examples 49-51, where the PCIe protocol defines an L1 low power state, the L1 low power state includes a plurality of L1 substates, and the hint data is to be used in association with an exit from a particular one of the plurality of L1 substates.

Example 53 includes the subject matter of example 52, where the particular L1 substate includes a L1.1 substate.

Example 54 includes the subject matter of any one of examples 46-54, where the hint data is to identify an action to be taken by the other device is association with a link state of the interconnect link.

Example 55 is a system including means to perform the method of any one of claims 46-54.

Example 56 includes the subject matter of example 55, where the means include a non-transitory machine-readable medium with instructions stored thereon, the instructions executable by a machine to perform at least a portion of the method of any one of examples 46-54.

Example 57 includes the subject matter of any one of examples 55-56, where the means include hardware circuitry to perform at least a portion of the method of any one of examples 46-54.

Example 58 is a method including: monitoring an auxiliary pin of an interface of a first device for a sideband signal in a set of sideband signals, where the interface is used by the first device to couple to a second device, the interface further includes a set of data pins to support high speed data communication on the link based on an interconnect protocol, and the set of sideband signal are outside the set of protocol-defined signals; interpreting the sideband signal as intended for a particular subcomponent of the first device; and sending information to the particular subcomponent based on the sideband signal.

Example 59 includes the subject matter of example 58, where the information causes the particular subcomponent to be selectively activated, and other subcomponents of the first device are to remain in an inactive state during activation of the particular subcomponent.

Example 60 includes the subject matter of any one of examples 58-59, where the set of protocol-defined signals are to be used for clock power management.

Example 61 includes the subject matter of any one of examples 58-60, where the auxiliary pin includes a PCIe CLKREQ# pin.

Example 62 includes the subject matter of any one of examples 58-61, where the auxiliary pin is used in a clock power management mode, the sideband signal is to be sent in a different particular mode, and the method further includes selecting either the clock power management mode or the particular mode to govern signaling on the auxiliary pin.

Example 63 includes the subject matter of example 62, where the sideband signal is sent while in the particular mode, and the method further includes: switching from the particular mode to the clock power management mode; and using the auxiliary pin to send the clock power management signal during the clock power management mode.

Example 64 includes the subject matter of any one of examples 58-63, further including a plurality of application layer resources and the particular subcomponent includes one of the plurality of application layer resources.

Example 65 includes the subject matter of any one of examples 58-64, where the particular subcomponent includes a particular block of hardware of the first device.

Example 66 includes the subject matter of any one of examples 58-65, where the interface is compliant with a Peripheral Component Interconnect Express (PCIe) standard and the interconnect protocol includes a PCIe-based protocol.

Example 67 includes the subject matter of example 66, where the interconnect link is to include a plurality of lanes, and the set of data lane pins includes a respective transmitter pin and a respective receiver pin for each one of the plurality of lanes.

Example 68 includes the subject matter of any one of examples 66-67, where the PCIe protocol defines an L1 low power state, the L1 low power state includes a plurality of L1 substates, and the hint data is to be used in association with an exit from a particular one of the plurality of L1 substates.

Example 69 includes the subject matter of example 68, where the particular L1 substate includes a L1.1 substate.

Example 70 includes the subject matter of any one of examples 58-69, where the hint data is to identify an action to be taken by the second device is association with a link state of the interconnect link.

A system including means to perform the method of any one of examples 58-70.

Example 72 includes the subject matter of example 71, where the means include a non-transitory machine-readable medium with instructions stored thereon, the instructions executable by a machine to perform at least a portion of the method of any one of examples 58-70.

Example 73 includes the subject matter of any one of examples 71-72, where the means include hardware circuitry to perform at least a portion of the method of any one of examples 58-70

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
an interface to couple to another device over an interconnect link, wherein the interface comprises:
a set of data lane pins to support data communication on the interconnect link based on an interconnect protocol; and
an auxiliary pin to support a clock power management signal defined by the interconnect protocol; and
circuitry to:
generate hint data for use by the other device; and
send the hint data as a sideband signal to the other device over the auxiliary pin, wherein the sideband signal is distinct from the clock power management signal.

2. The apparatus of claim 1, wherein the auxiliary pin is used in a clock power management mode, the sideband signal is to be sent in a different particular mode, and the circuitry is to select either the clock power management mode or the particular mode to govern signaling on the auxiliary pin.

3. The apparatus of claim 2, wherein the sideband signal is sent while in the particular mode, and the circuitry is to:
switch from the particular mode to the clock power management mode; and
use the auxiliary pin to send the clock power management signal during the clock power management mode.

4. The apparatus of claim 1, wherein the interface is compliant with a Peripheral Component Interconnect Express (PCIe) standard and the interconnect protocol comprises a PCIe-based protocol.

5. The apparatus of claim 4, wherein the auxiliary pin comprises a CLKREQ# pin defined by the PCIe standard.

6. The apparatus of claim 4, wherein the interconnect link is to comprise a plurality of lanes, and the set of data lane pins comprises a respective transmitter pin and a respective receiver pin for each one of the plurality of lanes.

7. The apparatus of claim 4, wherein the PCIe protocol defines an L1 low power state, the L1 low power state comprises a plurality of L1 substates, and the hint data is to be used in association with an exit from a particular one of the plurality of L1 substates.

8. The apparatus of claim 1, wherein the hint data is to identify an action to be taken by the other device in association with a link state of the interconnect link.

9. The apparatus of claim 1, wherein the apparatus is one of a host processor device or an endpoint device.

10. An apparatus comprising:
an interface to couple to a second device over a link to be established using the interface, wherein the interface comprises:
a set of data pins to support data communication on the link based on an interconnect protocol; and
an auxiliary pin separate from the set of data pins to support the link based on the interconnect protocol, wherein the interconnect protocol defines a set of protocol-defined signals to be communicated on the auxiliary pin; and
circuitry to:
monitor the auxiliary pin for a sideband signal in a set of sideband signals, wherein the set of sideband signals are outside the set of protocol-defined signals;
interpret the sideband signal in the set of sideband signals as intended for a particular subcomponent of the apparatus; and
send information to the particular subcomponent based on the sideband signal in the set of sideband signals.

11. The apparatus of claim 10, wherein the information causes the particular subcomponent to be selectively activated, and other subcomponents of the apparatus are to remain in an inactive state during activation of the particular subcomponent.

12. The apparatus of claim 10, wherein the set of protocol-defined signals are to be used for clock power management.

13. The apparatus of claim 12, wherein the auxiliary pin comprises a PCIe CLKREQ# pin.

14. The apparatus of claim 10, further comprising a plurality of application layer resources and the particular subcomponent comprises one of the plurality of application layer resources.

15. The apparatus of claim 10, wherein the particular subcomponent comprises a particular block of hardware of the apparatus.

16. A system comprising:
a first device comprising a first interface; and
a second device comprising a second interface, wherein the first and second devices are coupled via the first and second interfaces, each of the first and second interfaces comprise respective data pins to support lanes of a data link based on an interconnect protocol, each of the first and second interfaces further comprise a respective auxiliary pin to support a clock power management signal, and the auxiliary pin of the first device is connected to the auxiliary pin of the second device to form an auxiliary connection,
wherein the second device further comprises auxiliary sideband circuitry to:
generate hint data; and
send the hint data as a sideband signal to the first device over the auxiliary connection, wherein the sideband signal is distinct from the clock power management signal.

17. The system of claim 16, wherein the sideband signal comprises a first sideband signal, the first device comprises further auxiliary sideband circuitry to:
generate a second sideband signal to communicate out-of-band information to the second device; and
send the second sideband signal to the second device over the auxiliary connection, wherein the second sideband signal is distinct from the clock power management signal.

18. The system of claim 16, further comprising a third device, wherein the first device comprises a switch coupled to both the second device and the third device, the hint data is intended for the third device, the sideband signal identifies that the third device is a target of the hint data, and the first device is to forward the hint data to the third device.

19. The system of claim 16, wherein each of the first and second interfaces are compliant with a PCIe-based protocol, the auxiliary pin comprises a PCIe CLKREQ# pin, and the sideband signal is outside signals defined by the PCIe-based protocol.

20. The system of claim 16, further comprising a capability register to identify whether sideband signaling is supported by the first or second device or whether the auxiliary pin connection is limited to communicating the clock power management signal.

* * * * *